3,692,509
LEHR ROLL MILLBOARD FORMED FROM ASBESTOS FIBERS AND EMPLOYING COLLOIDAL SILICA-CALCIUM LIME AND BENTONITE AS A BINDER
Richard C. Breiner, Hatboro, Pa., assignor to Nicolet Industries, Inc., Ambler, Pa.
No Drawing. Continuation-in-part of abandoned application Ser. No. 641,469, May 26, 1967. This application Aug. 10, 1970, Ser. No. 62,629
Int. Cl. C03b *13/16;* C04b *43/04;* D21f *5/18*
U.S. Cl. 65—118                         14 Claims

ABSTRACT OF THE DISCLOSURE

An asbestos millboard particularly useful for the manufacture of lehr rolls consists essentially of asbestos fibers, such as 15–45% by weight chrysotile asbestos fibers, 40–55% by weight anthophyllite asbestos fibers and 0–25% by weight amosite asbestos fibers. As a binder for the asbestos in the millboard there is present a substantially calcium silicate free admixture consisting essentially of colloidal silica, calcium lime and bentonite clay, in the amounts 1.5–7% by weight, 3–9% by weight and >1.5–5% by weight, respectively, based on the millboard.

---

This application is a continuation-in-part of application Ser. No. 641,469 filed May 26, 1967, now abandoned.

This invention relates to asbestos millboard, particularly asbestos millboard useful in the manufacture of lehr rolls.

Asbestos millboard is used in the manufacture of carrying rolls and lehr rolls. Such rolls are fabricated by cutting discs from the millboard and assembling and compressing the discs on a mandrel. Rolls so prepared are useful for supporting and moving glass from the molten state to the finished hot glass plate and are especially useful for handling glass as it is taken from the annealing ovens or lehrs. Lehr rolls or traction rolls are used in the glass industry and the manufacture and structure and composition of such rolls are disclosed in U.S. Patent 3,317,303. The disclosures of this patent are herein incorporated and made part of this disclosure.

In the manufacture of lehr rolls employing asbestos millboard it is important that the lehr roll, particularly the asbestos millboard making up the lehr roll, be capable of withstanding elevated temperatures for a substantial period of time. The lehr roll must provide a heat resistant surface capable of gripping and moving and carrying the hot sheet of glass for long periods of time.

For the most part, however, the lehr rolls provided by the glass making industry have not been completely satisfactory. It appears that an important component in the asbestos millboard employed in the manufacture of lehr rolls is the binder component. Various binders have been employed and suggested heretofore but for the most part such binders have not been completely satisfactory. For example, some binders are too abrasive, other binders cannot withstand elevated operating temperatures; such as the temperatures to which lehr rolls employed in glass making are exposed, for a substantial period of time. Still other lehr rolls break down because of a failure of the binder employed in the manufacture of the asbestos millboard used in the lehr roll.

It is an object of this invention to provide an improved binder for asbestos millboard.

It is another object of this invention to provide an improved asbestos millboard useful for the manufacture of lehr rolls and an improved lehr roll.

Still another object of this invention is to provide an improved lehr roll made up of a special combination of asbestos fibers and binder therefor, the asbestos fibers and binder therefor being in the form of asbestos millboard.

How these and other objects of this invention are accomplished will become apparent in the light of the accompanying disclosure.

An improved asbestos millboard composition in accordance with this invention comprises asbestos fibers and as a binder therefor an admixture consisting essentially of colloidal silica, calcium lime and bentonite clay in the proportions 1.5–7, 3–9 and from about 1.5 to 5 parts by weight, respectively. Desirably, the asbestos component or asbestos fibers of the millboard composition consists essentially of or is made up of a major amount of amphibole asbestos fibers and, even more desirably, is comprised principally, i.e. above about 65% by weight, of amphibole asbestos fibers.

Asbestos fibers useful in the preparation of an asbestos millboard in accordance with this invention include chrysotile asbestos fibers in association with anthophyllite asbestos fibers and, if desired, amosite asbestos fibers. Other asbestos fibers, particularly the amphibole asbestos fibers, are also useful in the manufacture of asbestos millboard in accordance with this invention.

The binder component, the essential component of the improved asbestos millboard compositions in accordance with this invention, consists essentially of an admixture of colloidal silica, calcium lime and bentonite. These materials making up the binder are present as a physical mixture in the asbestos millboard composition in the percentages 1.5–7%, 3–9% and >1.5–5% by weight based on the millboard.

An asbestos millboard composition in accordance with this invention has the following composition:

|  | Percent by wt. |
|---|---|
| Crysotile asbestos fibers | 15–45 |
| Anthophyllite asbestos fibers | 40–55 |
| Anmosite asbestos fibers | 0–25 |
| Colloidal silica | 1.5–7 |
| Calcium lime | 3–9 |
| Bentonite clay | >1.5–5 |

One group of asbestos millboard prepared in accordance with this invention and useful for the manufacture of lehr roll has the composition:

|  | Percent by wt. |
|---|---|
| Chrysotile asbestos fibers | 15–25 |
| Anthophyllite asbestos fibers | 40–50 |
| Amosite asbestos fibers | 0–25 |
| Colloidal silica | 3–7 |
| Calcium lime | 5–9 |
| Bentonite clay | 3–5 |

Another group of asbestos millboard useful in the fabrication of lehr rolls in accordance with this invention has the composition:

|  | Percent by wt. |
|---|---|
| Chrysotile asbestos fibers | 35–45 |
| Anthophyllite asbestos fibers | 45–55 |
| Colloidal silica | 4–6 |
| Calcium lime | 3–5 |
| Bentonite clay | >1.5–5 |

A specific asbestos millboard composition in accordance with this invention is 21% by weight chrysotile asbestos fibers, 47% by weight anthophyllite asbestos fibers, 15% by weight amosite asbestos fibers, 5% by weight colloidal silica, 7% by weight calcium lime and 5% by weight bentonite clay.

In the preparation of asbestos millboard composition in order to obtain stability at elevated temperatures it is desirable to employ three types of asbestos fibers in intimate intermingled admixture and in the controlled proportions, all in accordance with this invention. The major portion of the asbestos fibers is made up of anthophyllite asbestos fibers. Another portion of the asbestos fibers is made up of chrysotile asbestos fibers. Optionally a third portion of the asbestos fibers is made up of amosite asbestos fibers.

The admixture of asbestos fibers is held together by a binder made up of colloidal silica, calcium lime and bentonite clay. The calcium lime component of the binder is ordinary hydrated lime. Desirably, the lime is low in magnesium content and for this reason it is referred to as calcium lime. Mortar grade calcium lime is suitable as the calcium lime component of the binder in accordance with this invention. Another component of the binder is colloidal silica. Colloidal silica includes any of the ultra fine silicas which usually exhibit a sub-micron particle size range. Suitable colloidal silica is obtained by burning silicon tetrachloride. Amorphous silica powder, usually commercially available at a particle size of about 50 millimicrons, is useful, as well as silica aerogels, as the colloidal silica component of the binder. In the manufacture of asbestos millboard, the colloidal silica may be added to the asbestos-containing furnish (a dispersion of asbestos fibers in water) in the form of finely divided powder or may be added in the form of a dispersion in water.

The following example is illustrative of the practices of this invention:

EXAMPLE NO. 1

An asbestos millboard composition made up of 21% by weight chrysotile asbestos fibers, 15% by weight amosite asbestos fibers, 47% by weight anthophyllite asbestos fibers, 5% by weight calcium silica, 7% by weight calcium lime and 5% by weight bentonite clay was prepared. Using conventional papermaking-type asbestos millboard manufacturing equipment, the above-identified asbestos fibers and lime in parts by weight indicated by the aforesaid percentages were beaten in water for about 3 minutes. Colloidal silica and bentonite clay were then added. A small amount of alum was added with clay but, if desired, the alum may be added shortly after the addition of the clay. The resulting watery admixture was again beaten for about 5 minutes, and the resulting furnish dumped to produce the asbestos millboard. The overall composition of the furnish in the beater before dumping is usually in the range of about 80–150 pounds of asbestos per 1000 pounds of water.

After dumping of the asbestos furnish onto the asbestos millboard forming screen, pressure was applied to the forming asbestos millboard so as to provide the desired density, usually in the range 65–75 pounds per cubic foot. At the time of initial manufacture the millboard comprises about 40–45% by weight moisture. The moisture content is reduced, such as by draining and exposure to air, to about 20–30% by weight to provide strength to the millboard before the millboard is cut into discs of the desired size for use in the manufacture of lehr roll.

The cut discs are then dried, such as in an atmospheric or open hot air tunnel dryer, to a bone dry basis, i.e. normally less than about 0.5% by weight moisture, before the cut, dried discs are assembled, onto the lehr roll. Usually the hot air tunnel drying operation wherein the cut discs are dried to a bone dry condition is carried out at a temperature in the range from about 210° F. to about 300° F. and higher, such as in the range 240–250° F., for an extended period of time of about 3–4 days. Other drying techniques, such as infra-red drying, and combination of standard drying techniques, may be employed. The resulting bone dry discs are then assembled onto a mandrel and compressed to provide the lehr roll.

Since during the millboard manufacturing operation and the drying operation hydrothermal conditions are not employed, i.e. elevated temperatures above about 200° F., especially above about 212° F., in the presence of steam and/or water and pressures in the range from about 5 to about 250 pounds per square inch, the binder components do not react to form calcium silicate, the use of which as a binder is undesirable. The formation of calcium silicate in the preparation of asbestos millboard in accordance with this invention is undesirable since calcium silicate is too brittle, too abrasive and too erosive as a binder for asbestos millboard intended for lehr roll manufacture.

EXAMPLE NO. 2

This example is illustrative of the preparation of asbestos millboard. Typical formulations for the preparation of asbestos millboard in accordance with this invention are set forth hereinbelow:

| Typical formulae (dry basis): | | |
|---|---|---|
| Chrysotile asbestos fibers, pounds | 300 | |
| Chrysotile asbestos fibers, pounds | | 150 |
| Anthophyllite asbestos fibers, pounds | 400 | 353 |
| Amosite asbestos fibers, pounds | | 80 |
| Colloidal silica, pounds | 16 | 35 |
| Lime, pounds | 30 | 50 |
| Bentonite, pounds | 7 | 32 |
| Alum, as required—usually 1.0% | | |

Stock preparation

Fiber and other ingredients are added to a suitable refining unit. A conventional beater is used herein but any stock pulper may be utilized, and auxiliary refining equipment is optional.

The asbestos fiber is added to water in the beater and followed with lime (dry). The stock is then refined for approximately three minutes after which silica and bentonite are added. Silica in this case is added as a liquid but dry colloidal silica may also be employed. Bentonite powder is pre-swelled by homogenizing in water at approximately 1.0 percent consistency prior to addition. Alum may be added with or following the bentonite. The complete furnish is then mixed for five minutes and dumped into a stock chest. At the time of dumping, the beater has approximately 80–150 lbs. of solids to 1000 lbs. of water. Additional water is added in the chest to dilute the composition to 80–150 lbs. of solids to 1600–3000 lbs. of water, respectively; water may be heated to 90–100° F. to improve subsequent drainage, if required.

Formation on millboard machine

The stock is then pumped to the millboard machine, also referred to as a wet machine, with additional water to dilute the composition to approximately 80–150 lbs. of solids to 8000–15,000 lbs. of water, respectively, i.e. approximately 1.0% consistency, solids to water. Stock is picked up on the two cylinder screens at approximately .004" per revolution per cylinder and combined on an accumulator roll, also referred to as a making roll, until the desired thickness is obtained; in the case of lerh roll board, ¼ inch is the most popular thickness. Various pressures may be applied to the accumulator roll to achieve a given density—usually 65–75 lb./ft.³ for lehr millboard; pressure loading may be attained by adding or subtracting weights or by air loading of rolls in contact with the accumulator roll.

After reaching the desired thickness, the sheet is cut and removed from the circumference of the accumulator roll (approximately 100 x 50 inches); it is then cut into two sheets (approximately 50 x 50 inches) and placed on a flat pallet. The sheet, at this point, contains approximately 40–45 percent of moisture by weight; additional moisture is removed by dry heat (250° F.), e.g. hot air drying, to approximately 20–30 percent by weight to provide structural integrity for die cutting into discs and eliminate frayed edges.

Conversion and drying

The discs are punched from the board either singularly or in multiples and fully dried in a hot air oven (210–300° F.) to a bone dry basis, i.e. less than 0.5% moisture by weight; latter may take 3–4 days, since the oven is fully charged with discs. Other drying conditions such as infra-red may be utilized, but hydrothermal conditions are not employed, i.e., temperatures from 200° F. in presence of steam and/or water and pressures of 5–250 lb./in.² are not employed.

Assembly

Once the discs are dried to less than 0.5% moisture, they are ready for assembly. The discs are placed onto a mandrel in sufficient number to result in any desired roll width; pressure of rack-up is usually 1200 p.s.i.

In the millboard forming operation the calcium lime is incorporated as a binder component so as to impart wet web strength (green strength) to the initially formed millboard. The bentonite clay and colloidal silica components of the binder are incorporated as primary binders for the millboard. As pointed out hereinabove in the manufacture of millboard in accordance with this invention, no attempt is made to produce calcium silicate and at no time during the millboard forming and processing and drying operations is the millboard subjected to elevated autoclaving temperatures, i.e. elevated temperatures and pressures in the presence of water and steam.

As will be apparent to those skilled in the art in the light of the accompanying disclosures, many modifications, alterations and substitutions are possible in the practice of this invention without departing from the spirit or scope thereof.

I claim:

1. A substantially calcium silicate free asbestos millboard consisting essentially of asbestos fibers and as a binder therefor a substantially calcium silicate free binder consisting essentially of colloidal silica, calcium lime and bentonite clay in the proportions 1.5–7, 3–9 and >1.5–5, respectively, by weight.

2. An asbestos millboard composition in accordance with claim 1 wherein said asbestos fibers consist essentially of amphibole asbestos fibers.

3. An asbestos millboard in accordance with claim 1 wherein said asbestos fibers comprise 15–45% by weight chrysotile asbestos fibers, 40–55% by weight anthrophyllite asbestos fibers and 0–25% by weight amosite asbestos fibers, the aforesaid percentages being based on the weight of the millboard.

4. An asbestos millboard in accordance with claim 1 wherein said asbestos fibers comprise 15–25% by weight chrysotile asbestos fibers, 40–50% by weight anthophyllite asbestos fibers and 10–25% by weight amosite asbestos fibers, the aforesaid percentages being based on the weight of the millboard.

5. An asbestos millboard in accordance with claim 1 wherein said asbestos fibers comprise 35–45% by weight chrysotile asbestos fibers and 45–55% by weight anthophyllite asbestos fibers, the aforesaid percentages being based on the weight of the millboard.

6. A substantially calcium silicate free asbestos millboard consisting essentially of asbestos fibers and as a binder therefor a substantially calcium silicate free binder consisting essentially of colloidal silica, calcium lime and bentonite clay in the proportions 5–7, 5–9 and 3–5, respectively, by weight.

7. An asbestos millboard composition in accordance with claim 6 wherein said asbestos fibers consist essentially of amphibole asbestos fibers.

8. A substantially calcium silicate free asbestos millboard composition consisting essentially of a compressed, intimately intermingled, bone dry, less than about 0.5% by weight moisture, admixture of 15–45% by weight chrysotile asbestos fibers, 0–25% by weight amosite asbestos fibers, 40–55% by weight anthophyllite asbestos fibers and as a binder therefor a mixture of 1.5–7% by weight colloidal silica, 3–9% by weight calcium lime and >1.5–5% by weight bentonite, all the aforesaid percentages by weight being based on said millboard.

9. A substantially calcium silicate free asbestos millboard composition in accordance with claim 8 wherein said chrysotile asbestos fibers are present in an amount in the range 15–25% by weight, said anthophyllite asbestos fibers are present in an amount in the range 40–50% by weight and said amosite asbestos fibers are present in an amount in the range of 10–25% by weight.

10. A substantially calcium silicate free asbestos millboard composition in accordance with claim 10 wherein the chrysotile asbestos fibers are present in an amount in the range 35–45% by weight, the anthophyllite asbestos fibers being present in an amount in the range 45–55% by weight.

11. A substantially calcium silicate free asbestos millboard composition in accordance with claim 8 wherein said chrysotile asbestos fibers are present in an amount in the range 15–25% by weight, said amosite asbestos fibers are present in an amount in the range 10–25% by weight, said anthophyllite asbestos fibers are present in an amount in the range 40–50% by weight, the colloidal silica is present in an amount in the range 1.5–7% by weight, the calcium lime is present in an amount in the range 5–9% by weight and the bentonite is present in an amount in the range 3–5% by weight.

12. A substantially calcium silicate free asbestos millboard composition in accordance with claim 8 wherein said chrysotile asbestos fibers are present in an amount of about 21% by weight, said amosite asbestos fibers are present in an amount in the range 15% by weight, said anthophyllite asbestos fibers are present in an amount of about 47% by weight, said colloidal silica is present in an amount of about 5% by weight, said calcium lime is present in an amount of about 7% by weight and said bentonite is present in an amount of about 5% by weight.

13. A lehr roll useful in glass manufacture and especially adapted for use at elevated temperatures having a material engaging surface provided by a substantially calcium silicate free asbestos-containing composition consisting essentially of 15–45% by weight chrysotile asbestos fibers, 40–55% by weight anthophyllite asbestos fibers, 0–25% by weight amosite asbestos fibers, 1.5–7% by weight colloidal silica, 3–9% by weight calcium lime and >1.5–5% by weight bentonite clay, the aforesaid percentages being based on the weight of said asbestos-containing composition.

14. In an operation wherein a hot glass sheet is carried on or moved by an asbestos-containing roll, the improvement which comprises fabricating said asbestos-containing roll of a substantially calcium silicate free asbestos millboard having the composition consisting essentially of 15–45% by weight chrysotile asbestos fibers, 40–55% by weight anthophyllite asbestos fibers, 0–25% by weight amosite asbestos fibers, 1.5–7% by weight colloidal silica, 3–9% by weight calcium lime and >1.5–5% by weight bentonite clay, the aforesaid percentages being based on the weight of said millboard composition.

References Cited

UNITED STATES PATENTS

| | | | |
|---|---|---|---|
| 2,699,097 | 1/1955 | Binkley | 162—153 |
| 2,873,480 | 2/1959 | Ayers et al. | 162—153 |
| 3,317,303 | 5/1967 | Shorr | 65—374 X |

S. LEON BASHORE, Primary Examiner

R. H. TUSHIN, Assistant Examiner

U.S. Cl. X.R.

29—132; 65—253, 374; 106—120; 162—153, 181 b, 181 c